(12) United States Patent
Yu et al.

(10) Patent No.: US 8,072,378 B2
(45) Date of Patent: Dec. 6, 2011

(54) NAVIGATION SYSTEM WITH ERROR-DETECTION ON DOPPLER FREQUENCIES OF SATELLITE SIGNALS

(75) Inventors: Xiaoguang Yu, Chengdu (CN); Bo Yu, Chengdu (CN); Xiaoyong He, Chengdu (CN); Jinghua Zou, Chengdu (CN)

(73) Assignee: O2Micro International, Ltd., Grand Cayman (KY)

( * ) Notice: Subject to any disclaimer, the term of this patent is extended or adjusted under 35 U.S.C. 154(b) by 0 days.

(21) Appl. No.: 12/792,723

(22) Filed: Jun. 2, 2010

(65) Prior Publication Data

US 2010/0328150 A1  Dec. 30, 2010

(30) Foreign Application Priority Data

Jun. 30, 2009  (CN) .......................... 2009 1 0158460

(51) Int. Cl.
*G01S 19/28* (2010.01)
*G01S 19/20* (2010.01)

(52) U.S. Cl. .............................. 342/357.67; 342/357.58

(58) Field of Classification Search ............. 342/357.58, 342/357.67
See application file for complete search history.

(56) References Cited

U.S. PATENT DOCUMENTS

| | | | | |
|---|---|---|---|---|
| 4,069,468 A * | 1/1978 | Bartram | ........................... | 367/91 |
| 4,242,682 A * | 12/1980 | Musha et al. | .................... | 342/93 |
| 4,661,816 A * | 4/1987 | Musha et al. | .................... | 342/91 |
| 5,457,462 A * | 10/1995 | Mitsumoto et al. | ............. | 342/93 |
| 6,473,030 B1 * | 10/2002 | McBurney et al. | ....... | 342/357.43 |
| 6,542,116 B1 * | 4/2003 | Sahai et al. | ............... | 342/357.62 |
| 6,642,884 B2 * | 11/2003 | Bryant et al. | ............ | 342/357.64 |
| 6,868,276 B2 * | 3/2005 | Nissila | ........................... | 455/504 |
| 7,812,764 B2 * | 10/2010 | Mizuochi et al. | ......... | 342/357.67 |
| 2002/0032015 A1 * | 3/2002 | Kitakado et al. | ............ | 455/277.1 |
| 2002/0054621 A1 * | 5/2002 | Kyeong et al. | ................ | 375/147 |
| 2004/0015308 A1 * | 1/2004 | Lee et al. | ......................... | 702/75 |
| 2004/0208138 A1 * | 10/2004 | Hayashi et al. | ............... | 370/286 |
| 2005/0163201 A1 * | 7/2005 | Krasner | ........................ | 375/150 |

FOREIGN PATENT DOCUMENTS

EP  561540 A1 *  9/1993

OTHER PUBLICATIONS

Spangenberg et al., "Code Acquisition for LEO satellite mobile communication using a serial-parallel correlator with FFT for Doppler estimation", Signals and System Group, Department of Electrical Engineering, University of Edinburgh, Scotland, undated but cited in 2005 article.*

* cited by examiner

*Primary Examiner* — Gregory C. Issing
*Assistant Examiner* — Frank McGue
(74) *Attorney, Agent, or Firm* — Wang Law Firm, Inc.; Li K. Wang

(57) ABSTRACT

A navigation system for detecting error on Doppler frequencies of a plurality of satellite signals measured by the navigation system is disclosed herein. The navigation system includes an offset calculator for calculating offsets of the Doppler frequencies of the satellite signals during a predetermined time period and calculating an average value of the offsets. The navigation system further includes an error detecting unit coupled to the offset calculator. The error detecting unit compares the offsets of the Doppler frequencies of the satellite signals with the average value of the offsets and determines whether the satellite signals are unavailable according to corresponding comparison results.

25 Claims, 9 Drawing Sheets

NAVIGATION SYSTEM WITH ERROR-DETECTION ON DOPPLER FREQUENCIES OF SATELLITE SIGNALS

FIELD OF THE INVENTION

The present invention relates to a navigation system, more specifically, relates to a navigation system with error-detection on Doppler frequencies of satellite signals.

BACKGROUND OF THE INVENTION

Nowadays, global positioning system (GPS) receivers are widely used in many applications to provide a position for a moving object according to satellite signals. FIG. 1 shows a block diagram of a conventional GPS receiver 100. As shown in FIG. 1, after a mixed signal including multiple satellite signals is received via an antenna, the mixed signal is processed through a pre-amplifier 102 for amplifying the mixed signal, a radio frequency to Intermediate frequency (RF/IF) convertor 104 for converting a frequency of the mixed signal from RF to IF, and an analog to digital (ND) convertor 106 for converting the mixed signal from analog to digital. Finally, the mixed signal is converted into a digital baseband signal. The digital baseband signal is then provided to a digital baseband processor 108.

The digital baseband processor 108 captures the multiple satellite signals by demodulating the digital baseband signal, tracks the multiple satellite signals, and gets the navigation information of the multiple satellite signals. Generally, the navigation information includes, but not limit to, a receiving time of a Pseudorange, a GPS carrier phase, and a Doppler frequency of the satellite signal. The digital baseband processor 108 includes a digital delay lock loop (DDLL), a digital phase lock loop (DPLL) and a digital frequency lock loop (DFLL) to measure the receiving time of the Pseudorange, the GPS carrier phase and the Doppler frequency of the satellite signals respectively. The digital baseband processor 108 outputs the navigation information into a navigation processor 110 for calculating the current position, velocity and time of a moving object (PVT information). Finally, the PVT information is displayed on a display unit 120.

In the digital baseband processor 108, the Doppler frequency of the satellite signal measured by the DFLL can be used for correcting the measuring value of the DDLL. However, if the received satellite signal is relatively weak (abnormal condition), the Doppler frequency measured by the DFLL may deviate from the actual Doppler frequency, which affects correcting the measuring value of the DDLL. As a result, the accuracy and stability of the GPS receiver 100 may be decreased.

FIG. 2 shows a diagram of a Doppler frequency of a satellite signal measured by the DFLL varying with respect to time under normal condition and abnormal condition. Line 202 represents the Doppler frequency measured by the DFLL varying with respect to time under normal condition and line 204 represents the Doppler frequency measured by the DFLL varying with respect to time under abnormal condition. As shown in FIG. 2, the measured value of the Doppler frequency declines smoothly with respect to the time under normal condition. However, the measured value of the Doppler frequency does not decline smoothly around a point of time 2450 s under abnormal condition. Therefore, it is to a system that detects whether the measured value of the Doppler frequency is deviate from the actual value and minimizes the deviation of measured Doppler frequency under abnormal condition according to the corresponding detection that the present invention is directed to.

SUMMARY OF THE INVENTION

The present invention provides a navigation system for detecting error on Doppler frequencies of a plurality of satellite signals measured by the navigation system. The navigation system includes an offset calculator for calculating offsets of the Doppler frequencies of the satellite signals during a predetermined time period and calculating an average value of the offsets. The navigation system further includes an error detecting unit coupled to the offset calculator. The error detecting unit compares the offsets of the Doppler frequencies of the satellite signals with the average value of the offsets and determines whether the satellite signals are unavailable according to corresponding comparison results.

In another embodiment, the present invention provides a method for detecting Doppler frequencies of a plurality of satellite signals measured by a navigation system. The method includes the steps of calculating offsets of the Doppler frequencies of the satellite signals during a predetermined time period; calculating an average value of the calculated offsets; comparing the offsets of the Doppler frequencies of the satellite signals with the average value of the calculated offsets; and determining whether the satellite signals are unavailable according to corresponding comparison results.

In yet another embodiment, the present invention provides a global positioning system (GPS) receiver. The GPS receiver includes a digital baseband processor for capturing a plurality of satellite signals from a plurality of satellites, tracking the satellite signals, and generating navigation information of the satellite signals. The GPS receiver further includes an offset calculator coupled to the digital baseband processor. The offset calculator calculates offsets of Doppler frequencies of the satellite signals during a predetermined time period according to the navigation information of the satellite signals and calculates an average value of the calculated offsets. The GPS receiver further includes an error detecting unit coupled to the offset calculator. The error detecting unit compares the offsets of the Doppler frequencies of the satellite signals with the average value and determines whether the satellite signals are unavailable according to corresponding comparison results

BRIEF DESCRIPTION OF THE DRAWINGS

Features and advantages of embodiments of the claimed subject matter will become apparent as the following detailed description proceeds, and upon reference to the drawings, wherein like numerals depict like parts, and in which:

DETAILED DESCRIPTION OF THE INVENTION

Figure 1:
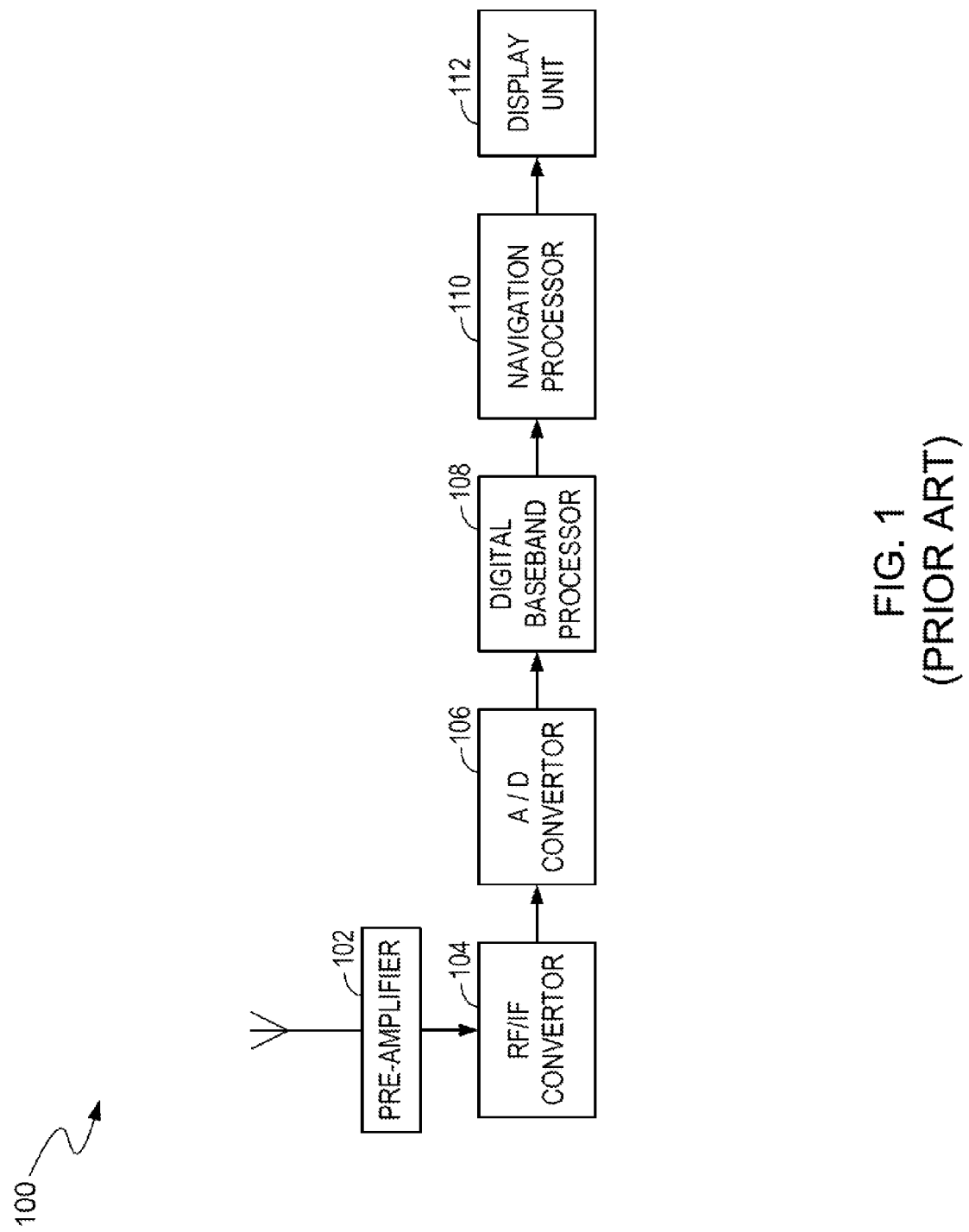
FIG. 1 shows a block diagram of a conventional GPS 100.
Figure 2:
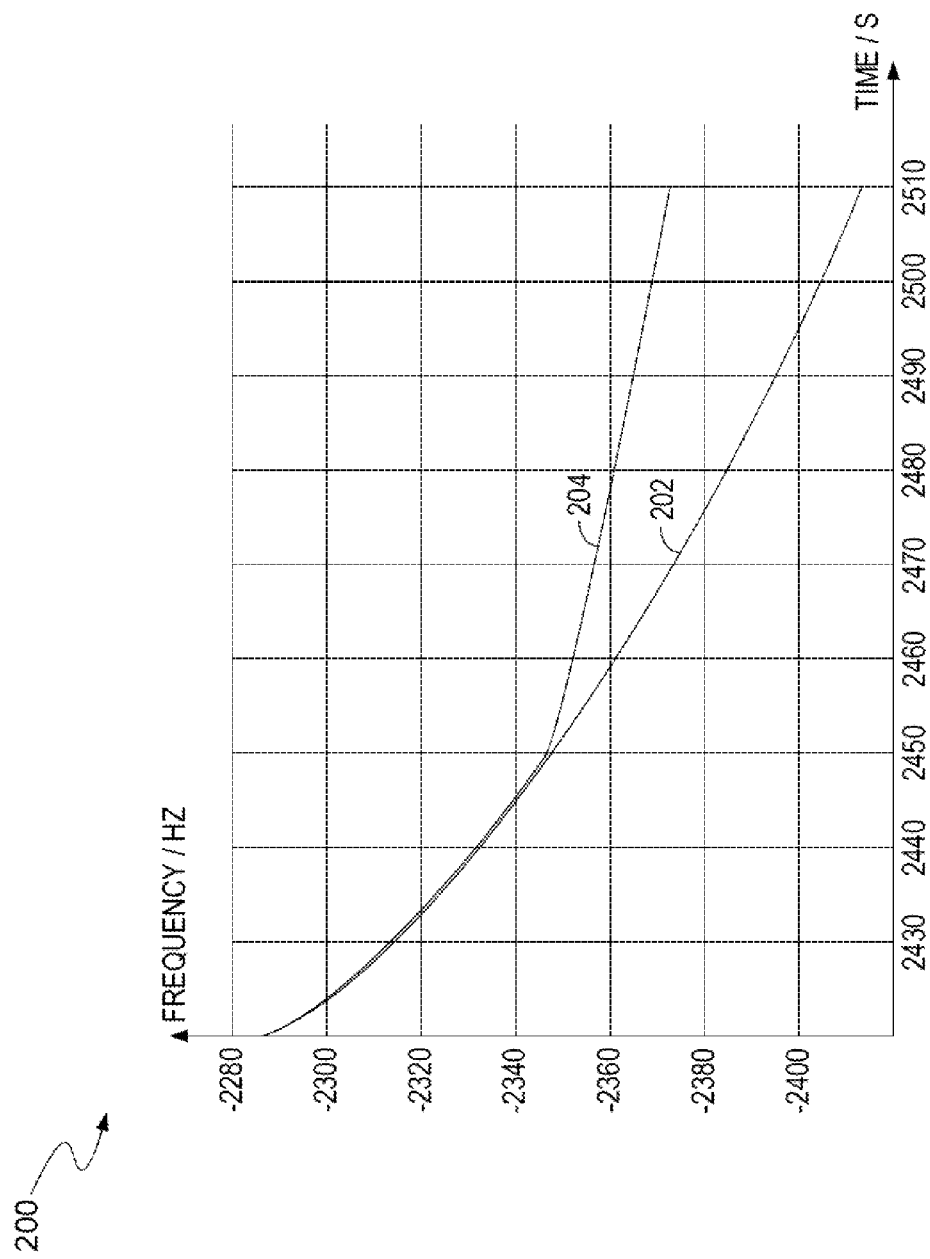
FIG. 2 shows a diagram of a Doppler frequency of a satellite signal measured by a digital frequency lock loop (DELL) varying with respect to time under normal condition and abnormal condition.

Reference will now be made in detail to embodiments of the present invention. While the invention will be described in conjunction with these embodiments, it will be understood that they are not intended to limit the invention to these embodiments. On the contrary, the invention is intended to cover alternatives, modifications and equivalents, which can be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention can be practiced without these specific details. In other instances, well known methods, procedures, components, and circuits have not been described in detail as not to unnecessarily obscure aspects of the present invention.

Embodiments in accordance with the present invention provide a navigation system with error-detection on Doppler frequencies of satellite signals. The navigation system includes an offset calculator for calculating offsets of the Doppler frequencies of the satellite signals during a predetermined time period and for calculating an average value of the calculated offsets. The navigation system further includes an error detecting unit for determining whether the satellite signals are available by comparing the offset of the Doppler frequency of each satellite signal with the average value. Advantageously, by determining the availabilities of the satellite signals according to the corresponding Doppler frequency offsets, the satellite signals with error Doppler frequency offsets will not be selected for positioning purpose and the unavailable satellite signals can be timely re-captured, which will improve the accuracy and stability of the navigation system.

According to the moving rules of the satellites and an moving object, an equation (1) as list below is used to calculate the Doppler frequency of a satellite signal, $$f_d = \frac{f_T(V_r \cdot a)}{c} \quad (1)$$

Wherein $f_T$ represents a frequency of the satellite signal, $V_r$ represents a vector of a relative velocity between the satellite and the moving object, a represents a vector unit with the straight direction from the satellite to the moving object, and c represents a propagation velocity of the satellite signal.

According to the equation (1), the offset of the Doppler frequency of the satellite signal during a time unit can be estimated. If an acceleration, which is on the straight direction from the satellite to the GPS receiver, of the GPS receiver is a value $A_1$, the offset of the Doppler frequency during the time unit can be given according to the equation (2).

$$\Delta f_d = \frac{f_T \cdot A_1}{c} \quad (2)$$

Since the differences between accelerations on respective straight directions from the corresponding satellites to the GPS receiver can be relatively small, the differences between the offsets of the Doppler frequencies of the corresponding satellite signals can be relatively small under normal condition. If a satellite signal received by the GPS receiver is relatively weak, the calculated value of the offset of the corresponding Doppler frequency may be much bigger or smaller than the other ones. In order to fix the problem, the invention discloses a system and method to detect whether the Doppler frequency of a received satellite signal is measured under normal condition by comparing a corresponding Doppler frequency offset of the target satellite signal with an average value of multiple Doppler frequency offsets of multiple received satellite signals. If the Doppler frequency of the satellite signal is not measured under normal condition, the satellite signal can be determined as unavailable.

Figure 3:
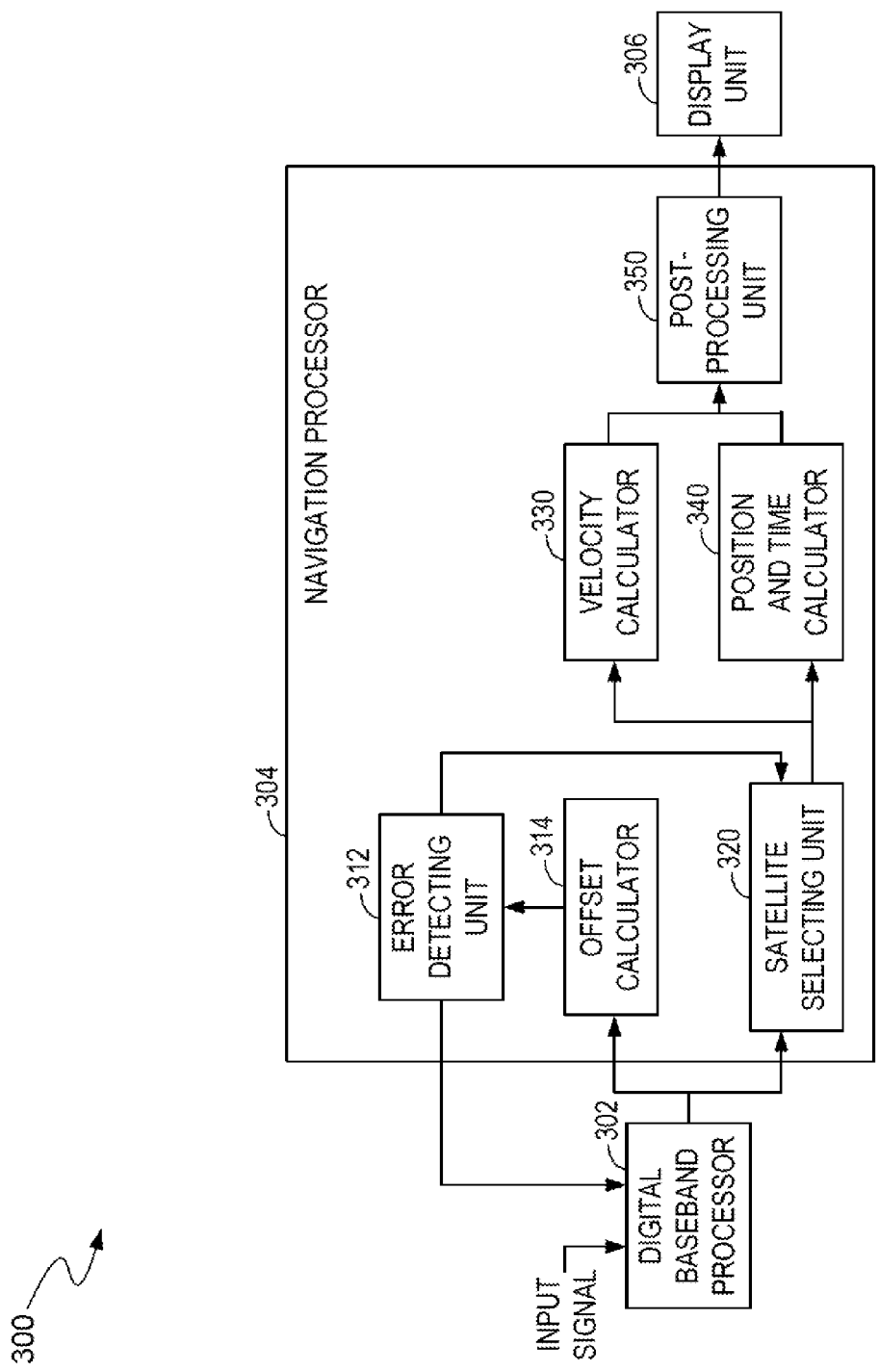
FIG. 3 illustrates a block diagram of a GPS receiver according to one embodiment of the present invention.

FIG. 3 illustrates a block diagram of a GPS receiver 300 according to one embodiment of the present invention. In FIG. 3, after multiple satellite signals received by the GPS receiver 300 is processed via a pre-amplifier (not shown in FIG. 3), a RF/IF convertor (not shown in FIG. 3), and an analog/digital, convertor (not shown in FIG. 3), the received satellite signals are converted into a digital baseband signal. The digital baseband signal is provided to a digital baseband processor 302.

The digital baseband processor 302 captures the satellite signals from the digital baseband signal, tracks the satellite signals and gets navigation information of the satellite signals. The navigation information of each satellite signal includes, but not limit to, a receiving time of a Pseudorange, a GPS carrier phase and a Doppler frequency of the corresponding satellite signal. The digital baseband processor 302 includes, but not limit to, a digital delay lock loop (DDLL), a digital phase lock loop (DPLL) and a digital frequency lock loop (DFLL) (not shown in FIG. 3) to respectively measure the receiving time of the Pseudorange, the GPS carrier phase and the Doppler frequency of the satellite signals based on the input digital baseband signal. The navigation information of the satellite signals is provided into a navigation processor 304. The navigation processor 304 includes a satellite selecting unit 320, an offset calculator 314, an error detecting unit 312, a velocity calculator 330, a position and time calculator 340, and a post-processing unit 350.

In one embodiment, the navigation information of the satellite signals is provided into the satellite selecting unit 320. The satellite selecting unit 320 selects a set of eligible satellite signals from the multiple satellite signals based on the received navigation information, and sends the navigation information of the selected satellite signals into the velocity calculator 330 and the position and time calculator 340 for positioning purpose. The velocity calculator 330 calculates a current velocity of a moving object according to the navigation information of the selected satellite signals. The position and time calculator 340 calculates a current position of the moving object and a current time according to the navigation information of the selected satellite signals. The calculated navigation values, including the current velocity and position of the moving object as well as the current time, are processed in the post-processing unit 350 for fixing a position on a navigation map, so as the positioning purpose can be achieved. Finally, a display unit 306 shows the position of the moving object on the navigation map to the user.

Furthermore, the navigation information of the satellite signals is also provided to the offset calculator 314 for calculating offsets of the Doppler frequencies of the satellite signals and for calculating an average value of the calculated offsets.

In operation, the offset calculator 314 calculates an offset $\Delta f_{di}$ of a Doppler frequency of an $i^{th}$ (i=1, 2, ..., N) satellite signal of the multiple satellite signals (the number of the multiple satellite signals is N) during a predetermined time period according to equation (3).

$$\Delta f_{di} = f_{di}(T_1) - f_{di}(T_2) \qquad (3)$$

wherein $f_{di}$ ($T_1$) represents a value of the Doppler frequency of the $i^{th}$ satellite signal measured at a first time $T_1$, $f_{di}$ ($T_2$) represents a value of the Doppler frequency of the $i^{th}$ satellite signal measured at a second time $T_2$ which is previous to the first time $T_1$ for the predetermined time period.

The offset calculator 314 further calculates the average value $\overline{\Delta f_d}$ of the calculated offsets $\Delta f_{di}$s(i=1, 2, ..., N) according to equation (4).

$$\overline{\Delta f_d} = \sum_i^N \Delta f_{di} / N. \qquad (4)$$

The calculated offsets $\Delta f_{di}$s(i=1, 2, ..., N) of the Doppler frequencies of the satellite signals and the average value $\overline{\Delta f_d}$ of the calculated offsets $\Delta f_{di}$s(i=1, 2, ..., N) are sent to the error detecting unit 312. The error detecting unit 312 determines whether the satellite signals are available according to comparisons between the calculated offsets $\Delta f_{di}$s(i=1, 2, ..., N) of the Doppler frequencies of the satellite signals and the average value $\Delta f_d$.

In one embodiment, if an offset $\Delta f_{di}$ of a Doppler frequency of one satellite signal is greater than a level of $w_1 * \overline{\Delta f_d}$, wherein $w_1$ represents a predetermined weight value, and also greater than a predetermined threshold $V_{THR1}$, the Doppler frequency of the satellite signal is determined as being measured under abnormal condition. Thus the error detecting unit 312 determines the satellite signal as unavailable. Then the error detecting unit 312 informs the satellite selecting unit 320 not to select this satellite signal for positioning purpose and further informs the digital baseband processor 302 to re-capture the satellite signal.

Advantageously, by comparing the calculated offsets $\Delta f_{di}$s (i=1, 2, ..., N) of the Doppler frequencies of the satellite signals with the level of $w_1 * \overline{\Delta f_d}$, the error detecting unit 312 can detect whether the Doppler frequencies of the satellite signals are measured under abnormal condition, and communicate with the satellite selecting unit 320 and the digital baseband processor 302 regarding to the detection result. Thus the unavailable satellite signals with Doppler frequencies measured under abnormal condition will not be selected by the satellite selecting unit 320 and will be timely re-captured by the digital baseband processor 302, which will improve the accuracy and stability of the system. Additionally, in order to improve the robustness of the system, the error detecting unit 312 can further compare the calculated offsets $\Delta f_{di}$s(i=1, 2, ..., N) of the Doppler frequencies of the satellite signals with the predetermined threshold $V_{THR1}$. If an offset $\Delta f_{di}$ of a Doppler frequency of a satellite signal is greater than the level of $w_1 * \overline{\Delta f_d}$ but less than the predetermined threshold $V_{THR1}$, the satellite signal may still be seen as available.

In another embodiment, if an offset $\Delta f_{di}$ of a Doppler frequency of one satellite signal is greater than the level of $w_1 * \overline{\Delta f_d}$, and also greater than the predetermined threshold $V_{THR1}$ (a first comparison result), the satellite signal is determined as unavailable for the positioning purpose. Thus the error detecting unit 312 informs the satellite selecting unit 320 not to select this satellite signal. However, the digital baseband processor 302 can continue to track the satellite signal and get the navigation information of the satellite signal. If the offset $\Delta f_{di}$ of the Doppler frequency of the satellite signal is greater than a level of $w_2 * \overline{\Delta f_d}$, wherein $w_2$ represents another predetermined weight value which is greater than $w_1$, and also greater than another predetermined threshold $V_{THR2}$ which is greater than $V_{THR1}$ (a second comparison result), the satellite signal is determined as unavailable for the positioning purpose and further unavailable to be continuously tracked. Thus the error detecting unit 312 informs the satellite selecting unit 320 not to select this satellite signal and also informs the digital baseband processor 302 to re-capture this satellite signal from the input digital baseband signal.

Under some circumstances, when a satellite signal is unavailable for the satellite selecting unit 320 for the positioning purpose, the satellite signal may be available to be tracked by the digital baseband processor 302. Advantageously, by determining whether a satellite signal is available for the positioning purpose and further available to be continuously tracked based on different comparison results, e.g., the first and the second comparison results, the satellite signal which is unavailable for the satellite selecting unit 320 for the positioning purpose may be tracked continuously by the digital baseband processor 302. Once the satellite signal becomes stronger after a time period, the satellite signal will become available for the satellite selecting unit 320. As a result, the efficiency of the system can be improved. Similarly, the predetermined threshold $V_{THR2}$ is used for improving the robustness of the system. If an offset $\Delta f_{di}$ of a Doppler frequency of a satellite signal is greater than the level of $w_2 * \overline{\Delta f_d}$ but less than the predetermined threshold $V_{THR2}$, the satellite signal may still be seen as available to be tracked by the digital baseband processor 302.

In one embodiment, if a carrier to noise ratio (CNR) of one satellite signal calculated by the digital baseband processor 302 is greater than a predetermined threshold $V_{CNR}$, the digital baseband processor 302 determines that the corresponding satellite signal is available and does not send the navigation information of the corresponding satellite signal to the offset calculator 314 for further calculation. Thus, the error detecting unit 312 will not determine the availability of the satellite signal which may affect the operation of the satellite selecting unit 320 and the digital baseband processor 302 as described above.

In another embodiment, the offset calculator 314 calculates the offsets $\Delta f_{di}$s of the Doppler frequencies of the satellite signals and the average value $\overline{\Delta f_d}$ of the offsets $\Delta f_{di}$ s for L times, wherein L is a positive integer. Each time the error detecting unit 312 determines the availabilities of the satellite signals by comparing the corresponding offsets $\Delta f_{di}$s with the corresponding average value $\Delta f_d$. If one satellite signal is determined as unavailable for M times, wherein M is a positive integer and the error detecting unit 312 concludes that the satellite signal is unavailable. Otherwise, the error detecting unit 312 concludes that the satellite signal is available. As such, the accuracy and stability of the system can be improved even the received satellite signals are relatively weak.

Figure 4:
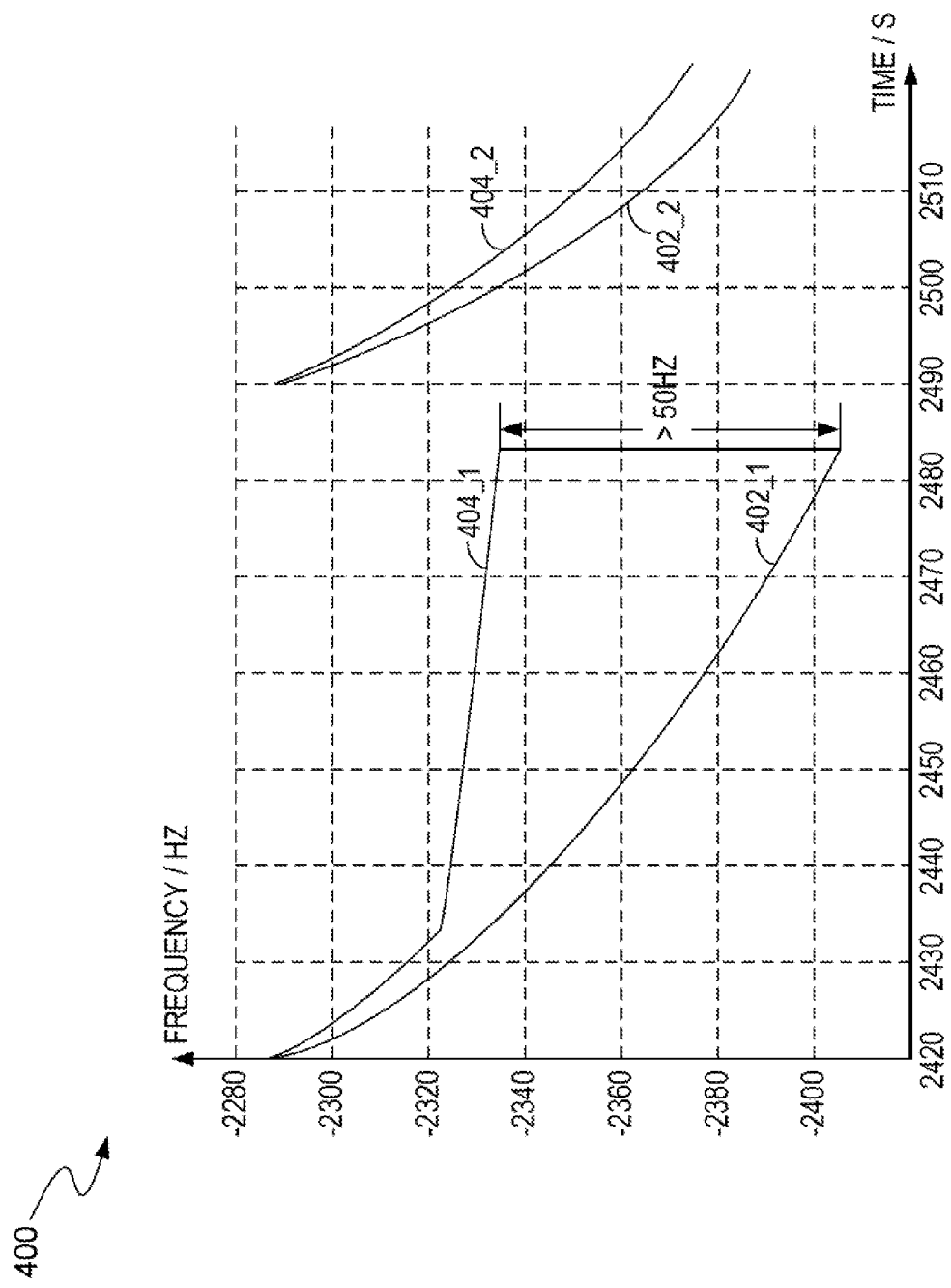
FIG. 4 shows a diagram of a Doppler frequency of a satellite signal measured by a DFLL varying with respect to time according to one embodiment of the present invention.

FIG. 4 shows a diagram of a Doppler frequency of a satellite signal measured by the DFLL varying with respect to time in the GPS receiver 300 according to one embodiment of the present invention. FIG. 4 is described in combination with FIG. 3.

As shown in FIG. 4, line 402_1 indicates an actual Doppler frequency of the satellite signal varying with respect to time, and line 404_1 indicates the Doppler frequency of the satellite signal, which is measured by the DFLL of the GPS receiver 300, varying with respect to time. After a time 2430 s, the measured Doppler frequency dose not decreased as quickly as the actual Doppler frequency. When the error detecting unit 312 detects the satellite signal is unavailable between a time 2480 s and a time 2490 s, the difference between the measured Doppler frequency 404_1 and the actual Doppler frequency 402_1 is greater than 50 HZ. After the error detecting unit 312 informs the digital baseband processor 302 to re-capture the satellite signal, the digital baseband processor 302 starts to re-capture the satellite signal and measure the Doppler frequency of the satellite signal at a time 2490 s. Line 402_2 indicates an actual Doppler frequency of the re-captured satellite signal varying with respect to time. Line 404_2 indicates the Doppler frequency of the re-captured satellite signal, which is measured by the DFLL of the GPS receiver 300, varying with respect to time.

Accordingly, by using the offset calculator 314 and the error detecting unit 312, the wrong measurement on the Doppler frequency of the satellite signal can be timely detected and corrected.

Figure 5:
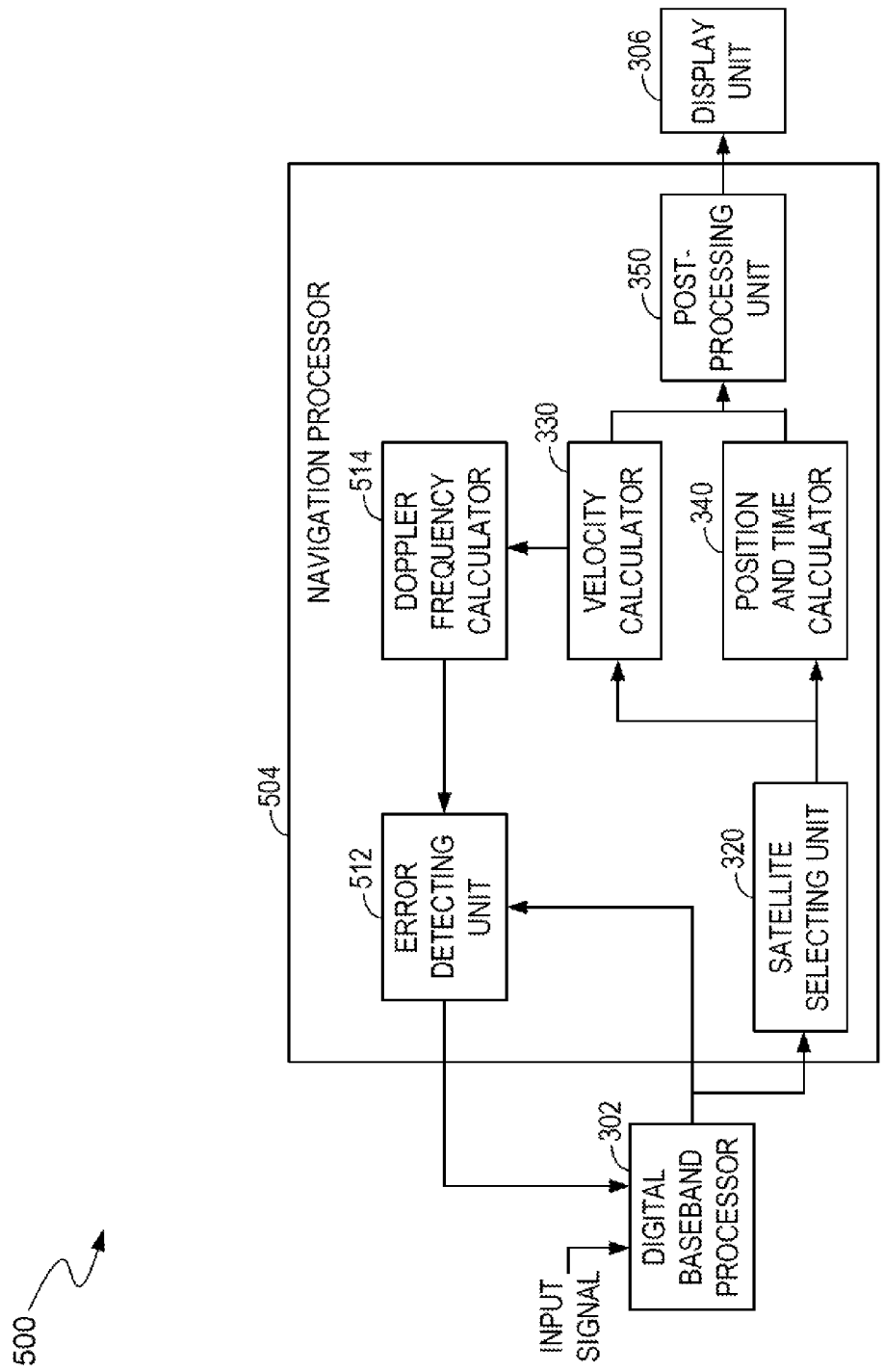
FIG. 5 illustrates a block diagram of a GPS receiver according to another embodiment of the present invention.

FIG. 5 illustrates a block diagram of a GPS receiver 500 according to one embodiment of the present invention. Elements that are labeled the same as in FIG. 3 have similar functions and will not be described herein. FIG. 5 is described in combination with FIG. 3.

In the example of FIG. 5, a navigation processor 504 compares a measured value $F_1$ of the Doppler frequency of a satellite signal with a reference value $F_2$ of the Doppler frequency of the satellite signal. The measured value $F_1$ of the Doppler frequency of the satellite signal is measured by the DFLL of the digital baseband processor 302. The reference value $F_2$ of the Doppler frequency of the satellite signal is calculated according to equation (1) based on the current velocity of the GPS receiver 500 calculated by the velocity calculator 330. The navigation processor 504 further determines whether the satellite signal is available to be continuously tracked by the digital baseband processor 302 according to the comparison result.

After the satellite selecting unit 320 selects a set of eligible satellite signals from multiple received satellite signals and sends the navigation information of the selected satellite signals to the velocity calculator 330, the velocity calculator 330 calculates the current velocity of the GPS receiver 500. For one satellite signal, the velocity calculator 330 calculates a vector of a relative velocity $V_r$ between the corresponding satellite and the GPS receiver 500, and sends the calculated value $V_r$ into a Doppler frequency calculator 514. Thus, the reference value $F_2$ of the Doppler frequency of the satellite signal can be calculated by the Doppler frequency calculator 514 according to equation (1).

$$F_2 = \frac{f_T(V_r \cdot a)}{c} \quad (1)$$

Wherein $f_T$ represents a frequency of the satellite signal, a represents a vector unit with the straight direction from the satellite to the GPS receiver 500, and c represents a propagation velocity of the satellite signal. In one embodiment, the Doppler frequency calculator 514 can be implemented in software. In other embodiments, the Doppler frequency calculator 514 can be implemented in hardware or firmware.

Consequently, an error detecting unit 512 compares the measured value $F_1$ output from the digital baseband processor 302 with the reference value $F_2$ calculated by the Doppler frequency calculator 514. If an absolute value of a difference between the measured value $F_1$ and the reference value $F_2$ is greater than a predetermined threshold $F_{THR}$, the error detecting unit 512 determines that the corresponding satellite signal is unavailable to be continuously tracked, and informs the digital baseband processor 302 to re-capture the satellite signal.

Advantageously, to detect whether the measured value $F_1$, which is measured by the DFLL (not shown in FIG. 3) of the digital baseband processor 302, of the Doppler frequency of a satellite signal is right by comparing the measured value $F_1$ with the reference value $F_2$, which is calculated based on the current velocity of the GPS receiver 500, of the Doppler frequency of the satellite signal, the satellite signal which is unavailable to be continuously tracked can be timely re-captured, which will improve the accuracy and stability of the system.

Although the navigation processor 304 of the GPS receiver 300 and the navigation processor 504 of the GPS receiver 500 are illustrated in FIG. 3 and FIG. 5 separately, the structures and the functions of the navigation processor 304 and the navigation processor 504 can be combined and integrated into one GPS receiver in other embodiments.

Figure 6:
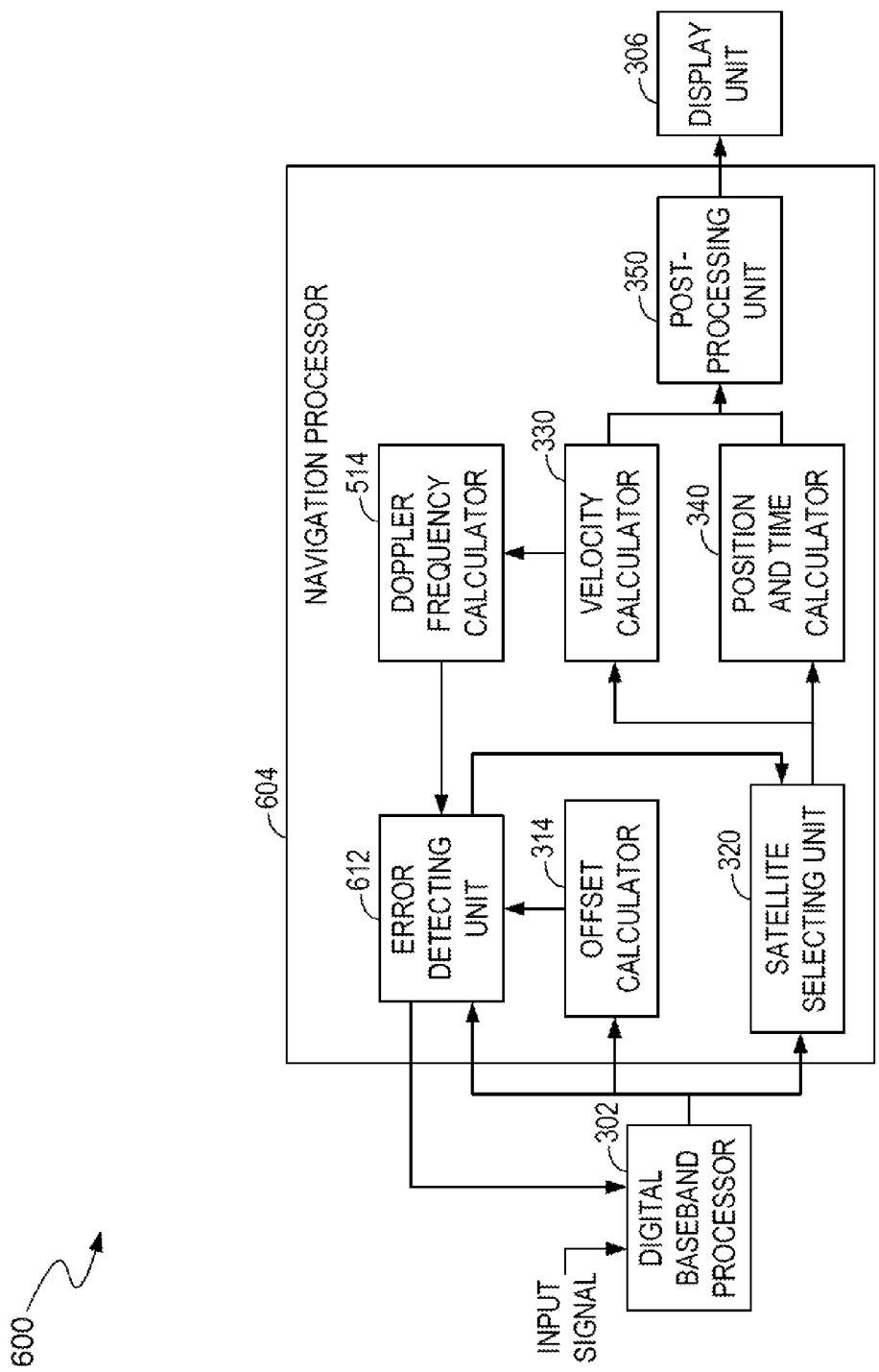
FIG. 6 illustrates a block diagram of a GPS receiver according to yet another embodiment of the present invention.

FIG. 6 illustrates an exemplary block diagram of a GPS receiver 600 integrating the structures and the functions of the navigation processor 304 in FIG. 3 and the navigation processor 504 in FIG. 5 according to one embodiment of the present invention. Elements that are labeled the same as in FIG. 3 and FIG. 5 have similar functions and will not be described herein. FIG. 6 is described in combination with FIG. 3 and FIG. 5.

Similar to the error detecting unit 312 in the navigation processor 304, an error detecting unit 612 in a navigation processor 604 receives the calculated offsets $\Delta f_{di}$s (i=1, 2, ..., N, N represents the number of the satellite signals) of the Doppler frequencies of the satellite signals and the average value $\overline{\Delta f_d}$ of the calculated offsets $\Delta f_{di}$s (i=1, 2, ..., N) from the offset calculator 314 and determines whether the satellite signals are available according to comparisons between the calculated offsets $\Delta f_{di}$s(i=1, 2, ..., N) of the Doppler frequencies of the satellite signals and the average value $\overline{\Delta f_d}$.

If the error detecting unit 612 determines a satellite signal is not available for the positioning purpose and/or to be tracked continuously, the error detecting unit 612 informs the satellite selecting unit 320 not to select the satellite signal and/or inform the digital baseband processor 302 to re-capture the satellite signal.

Furthermore, the error detecting unit 612 has similar function as the error detecting unit 512 in the navigation processor 504. The error detecting unit 612 compares a measured value $F_1$ of a Doppler frequency of a satellite signal output from the digital baseband processor 302 with a reference value $F_2$ of the Doppler frequency of the satellite signal calculated by the Doppler frequency calculator 514. When the error detecting unit 612 determines that the satellite signal is not available to be continuously tracked according to a corresponding comparison result, the error detecting unit 612 informs the digital baseband processor 302 to re-capture the satellite signal.

Figure 7:
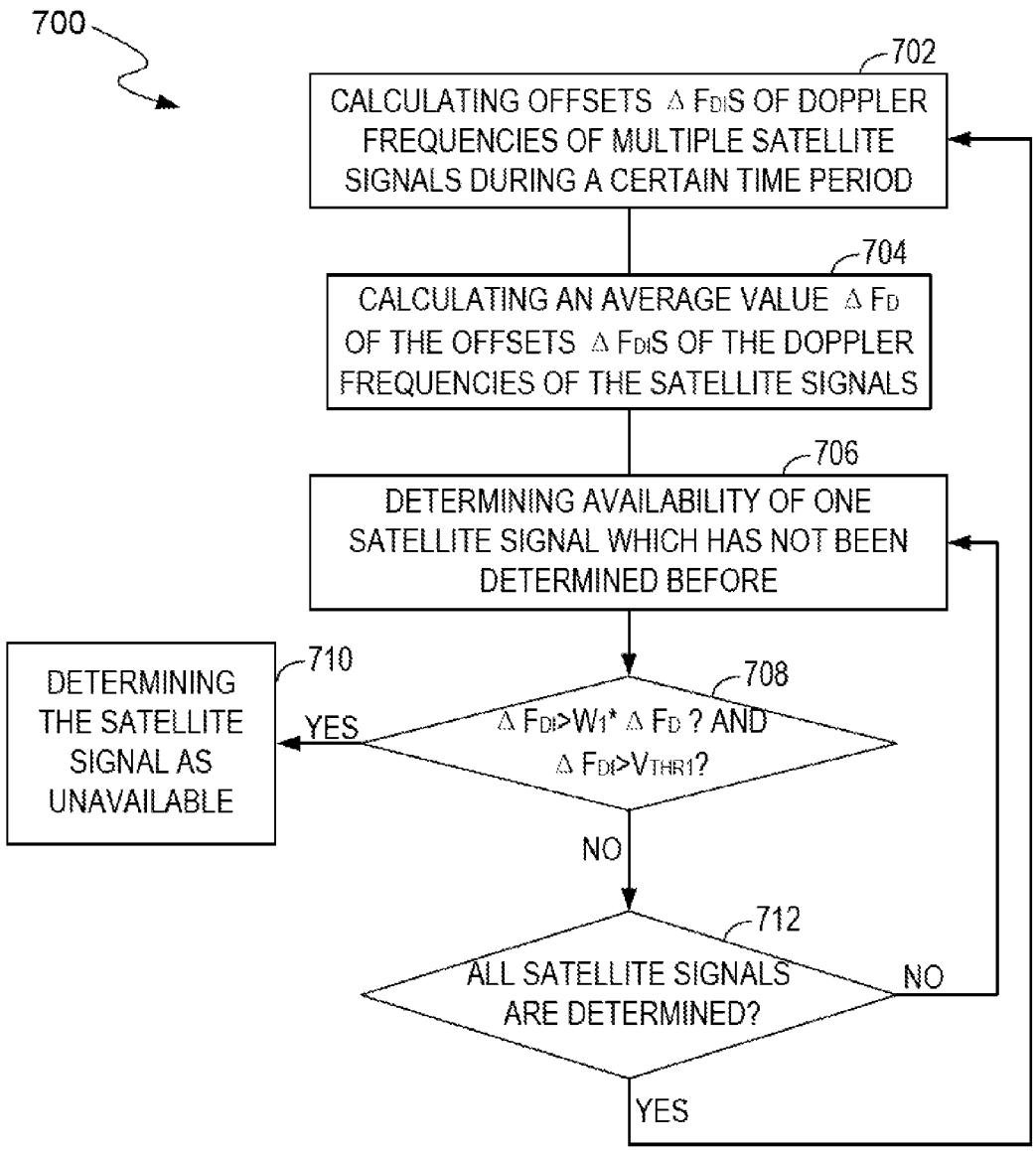
FIG. 7 illustrates a flowchart of operations performed by a GPS receiver according to one embodiment of the present invention.

FIG. 7 illustrates a flowchart 700 of operations performed by a GPS receiver, e.g., the GPS receiver 300 in FIG. 3, according to one embodiment of the present invention. FIG. 7 is described in combination with FIG. 3.

After the GPS receiver 300 starts to work, multiple satellite signals received from multiple satellites are converted into a digital baseband signal via the pre-amplifier (not shown in FIG. 3), the RF/IF convertor (not shown in FIG. 3), and the analog/digital convertor (not shown in FIG. 3). The digital baseband processor 302 captures the satellite signals from the digital baseband signal, tracks the satellite signals and gets navigation information of the satellite signals. Consequently, the navigation information of the satellite signals is input into the offset calculator 314.

In block 702, the offset calculator 314 calculates offsets $\Delta f_{di}$s of the Doppler frequency of the satellite signals during a predetermined time period. More specifically, for an $i^{th}$ (i=1, 2, ..., N, N represents the number of the satellite signals) satellite signal of the satellite signals (the number of the multiple satellite signals is N), the offset calculator 314 calculates an offset $\Delta f_{di}$ of a Doppler frequency of the $i^{th}$ (i=1, 2, ..., N) satellite signal during the predetermined time period according to equation (3).

$$\Delta f_{di} = f_{di}(T_1) - f_{di}(T_2) \quad (3)$$

wherein $f_{di}(T_1)$ represents a value of the Doppler frequency of the $i^{th}$ satellite signal measured at a first time $T_1$. $f_{di}(T_2)$ represents a value of the Doppler frequency of the $i^{th}$ satellite signal measured at a second time $T_2$ which is previous to the first time $T_1$ for the predetermined time period.

In block 704, the offset calculator 314 calculates an average value $\overline{\Delta f_d}$ of the calculated offsets $\Delta f_{di}$s(i=1, 2, ..., N) according to equation (4), $$\overline{\Delta f_d} = \sum_i^N \Delta f_{di}/N \quad (4)$$

the calculated offsets $\Delta f_{di}$s(i=1, 2, ..., N) of the Doppler frequencies of the satellite signals and the average value $\overline{\Delta f_d}$ is provided into the error detecting unit 312.

In block 706, the error detecting unit 312 determines availability of an $i^{th}$ (i=1, 2, ..., N) satellite signal, which has not been determined before, according to a corresponding calculated offset $\Delta f_{di}$ of the Doppler frequency of the $i^{th}$ satellite signal and the average value $\overline{\Delta f_d}$.

In block 708, if the offset $\Delta f_{di}$ of the Doppler frequency of the $i^{th}$ satellite signal is greater than a level of $w_1 * \overline{\Delta f_d}$, wherein $w_1$ represents a predetermined weight value, and also greater than a predetermined threshold $V_{THR1}$, the Doppler frequency of the satellite signal can be determined as being measured under abnormal condition. Thus the error detecting unit 312 determines the satellite signal as unavailable in block 710. Then the error detecting unit 312 informs the satellite selecting unit 320 not to select this satellite signal and further inform the digital baseband processor to re-capture the satellite signal. In block 708, if the offset $\Delta f_{di}$ is no greater than the level of $w_1 * \overline{\Delta f_d}$, or no greater than the first predetermined threshold $V_{THR1}$, the flowchart 700 goes to block 712.

In block 712, if the availabilities of all the satellite signals have been determined, the flowchart 700 returns to block 702. The offset calculator 314 continues to calculate offsets $\Delta f_{di}$s of the Doppler frequency of the satellite signals during a next time period. Otherwise, the flowchart 700 returns to block 706. The error detecting unit 312 continues to determine availability of a next satellite signal.

Figure 8:
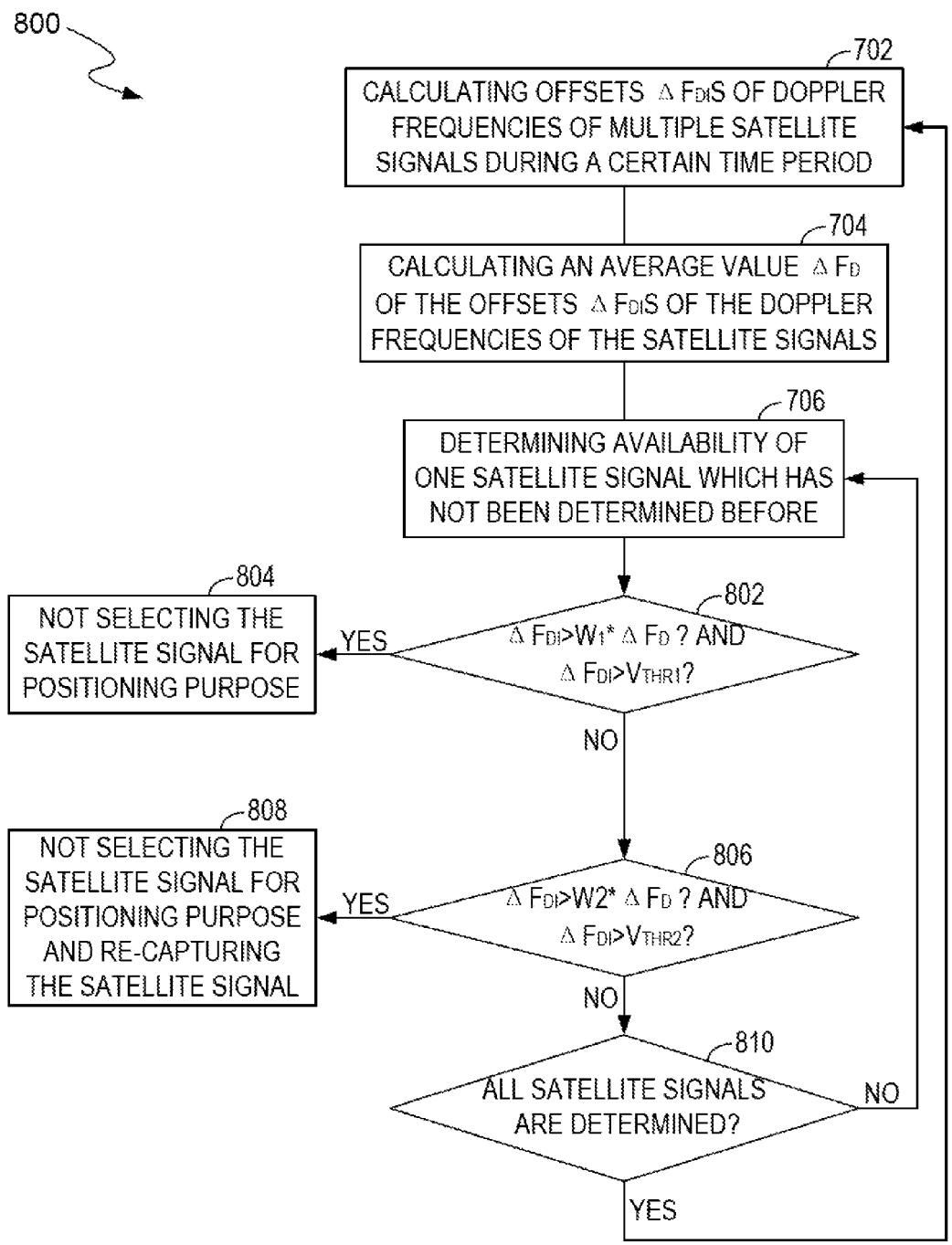
FIG. 8 illustrates a flowchart of operations performed by a GPS receiver according to another embodiment of the present invention.

FIG. 8 illustrates a flowchart 800 of operations performed by a GPS receiver, e.g., the GPS receiver 300 in FIG. 3, according to another embodiment of the present invention. Steps that are labeled the same as in FIG. 3 have similar functions and will not be described herein. FIG. 8 is described in combination with FIG. 3 and FIG. 7.

After the offset calculator 314 calculates the offsets $\Delta f_{di}$s (i=1, 2, ..., N, N represents the number of the satellite signals) of the Doppler frequency of the satellite signals during a predetermined time period in block 702 and calculates the average value $\overline{\Delta f_d}$ of the calculated offsets $\Delta f_{di}$ s in block 704, the error detecting unit 312 determines availability of an $i^{th}$ (i=1, 2, ..., N) satellite signal, which has not been determined before, according to a corresponding calculated offset $\Delta f_{di}$ and the average value $\overline{\Delta f_d}$ in block 706. Then flowchart 800 goes to block 802.

In block 802, if the offset $\Delta f_{di}$ of the Doppler frequency of the $i^{th}$ satellite signal is greater than a level of $w_1 * \overline{\Delta f_d}$, wherein $w_1$ represents a first predetermined weight value, and also greater than a first predetermined threshold $V_{THR1}$, the corresponding satellite signal can be determined as unavailable for the positioning purpose. Thus the error detecting unit 312 informs the satellite selecting unit 320 not to select this satellite signal for the positioning purpose in block 804. In block 802, if the offset $\Delta f_{di}$ is no greater than the level of $w_1 * \overline{\Delta f_d}$, or no greater than the first predetermined threshold $V_{THR1}$, the flowchart 800 goes to block 806.

In block 806, if the offset $\Delta f_{di}$ is greater than a level of $w_2 * \overline{\Delta f_d}$, wherein $w_2$ ($w_2 > w_1$) represents a second predetermined weight value, and also greater than a second predetermined threshold $V_{THR2}$ ($V_{THR2} > V_{THR2}$), the corresponding satellite signal can be determined as unavailable for the positioning purpose and further unavailable to be continuously tracked. Thus, the error detecting unit 312 informs the satellite selecting unit 320 not to select this satellite signal for the positioning purpose and further informs the digital baseband processor 302 to re-capture this satellite signal from the input digital baseband signal in block 808. In block 806, if the offset $\Delta f_{di}$ is no greater than the level of $w_2 * \overline{\Delta f_d}$, or no greater than the second predetermined threshold $V_{THR2}$, the flowchart 800 goes to block 810.

In block 810, if the availabilities of all the satellite signals have been determined, the flowchart 800 returns to block 702. The offset calculator 314 continues to calculate offsets $\Delta f_{di}$s of the Doppler frequency of the satellite signals during a next time period. Otherwise, the flowchart 800 returns to block 706. The error detecting unit 312 continues to determine availability of a next satellite signal.

Figure 9:
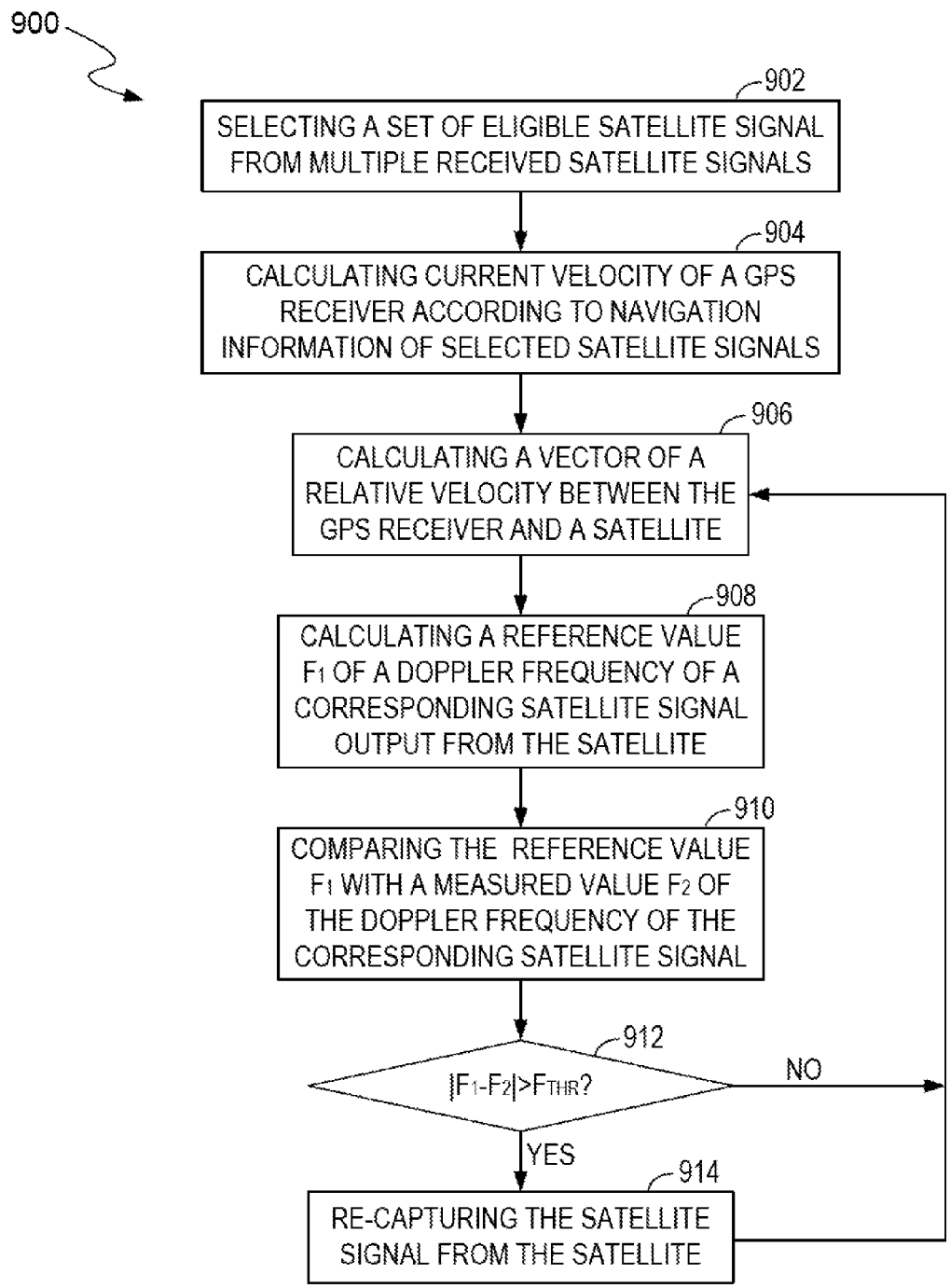
FIG. 9 illustrates a flowchart of operations performed by a GPS receiver according to yet another embodiment of the present invention.

FIG. 9 illustrates a flowchart 900 of operations performed by a GPS receiver, e.g., the GPS receiver 500 in FIG. 5, according to one embodiment of the present invention.

After the digital baseband processor 302 provides the navigation information of multiple received satellite signals to the satellite selecting unit 320, the satellite selecting unit 320 selects a set of eligible satellite signals from the satellite signals according to the received navigation information and sends the navigation information of the selected satellite signals into the velocity calculator 330 in block 902. In block 904, the velocity calculator 330 calculates a current velocity of the GPS receiver 500 according to the navigation information of the selected satellite signals.

In block 906, the velocity calculator 330 calculates a vector $V_r$ of a relative velocity between the GPS receiver 500 and a satellite. The calculated value $V_r$ is input into the Doppler frequency calculator 514. In block 908, the Doppler frequency calculator 514 calculates a reference value $F_1$ of the Doppler frequency of a corresponding satellite signal received from the satellite according to equation (1).

$$F_1 = \frac{f_T(V_r \cdot a)}{c} \quad (1)$$

Wherein $f_T$ represents a frequency of the satellite signal, a represents a vector unit with the straight direction from the satellite to the GPS receiver 500, and c represents a propagation velocity of the satellite signal.

In block 910, the error detecting unit 512 compares the reference value $F_1$ of the Doppler frequency of the satellite signal with a measured value $F_2$ of the Doppler frequency of the satellite signal output from the digital baseband processor 302. In block 912, if an absolute value of a difference between the reference value $F_1$ and the measured value $F_2$ is greater than a predetermined threshold $F_{THR}$, the error detecting unit 512 determines that the satellite signal is unavailable to be continuously tracked and informs the digital baseband processor 302 to re-capture the satellite signal from the satellite in block 914. Then the flowchart 900 returns to block 906. The velocity calculator 330 continues to calculate a vector $V_r$ of a relative velocity between the GPS receiver 500 and a next satellite.

In block 912, if the absolute value of the difference between the reference value $F_1$ and the measured value $F_2$ is no greater than the predetermined threshold $F_{THR}$ in block 912, the flowchart 900 returns to block 906.

Accordingly, the embodiments in accordance with the present invention provide a GPS receiver with error-detection on Doppler frequencies of satellite signals. The GPS receiver includes an offset calculator for calculating offsets $\Delta f_{di}$s (i=1, 2, ..., N) of the Doppler frequencies of the satellite signals during a predetermined time period according to the navigation information of the satellite signals and for calculating an average value $\overline{\Delta f_d}$ of the calculated offsets $\Delta f_{di}$s. The GPS receiver further includes an error detecting unit for determining availabilities of the satellite signals by comparing the offset $\Delta f_{di}$ of the Doppler frequency of each satellite signal with the average value $\overline{\Delta f_d}$.

If an offset $\Delta f_{di}$ of a Doppler frequency of one satellite signal is greater than a level of $w_1 * \Delta f_d$, wherein $w_1$ represents a predetermined weight value, and also greater than a predetermined threshold $V_{THR1}$, the Doppler frequency of the satellite signal can be determined as being measured under abnormal condition. Thus the error detecting unit 312 determines the satellite signal as unavailable. Then the error detecting unit 312 informs the satellite selecting unit 320 not to select this satellite signal for positioning purpose and further inform the digital baseband processor to re-capture the satellite signal.

Advantageously, by determining the availabilities of the satellite signals according to the comparisons between the corresponding Doppler frequency offsets and the average value of those offsets, the unavailable satellite signals whose Doppler frequencies are measured under abnormal condition will not be selected for the positioning purpose and can be timely re-captured. Thus the accuracy and stability of the system can be improved.

Furthermore, the GPS receiver includes a Doppler frequency calculator for calculating a reference value of a Doppler frequency of a satellite signal based on a current velocity of the GPS receiver. The error detecting unit compares the reference value of the Doppler frequency of the satellite signal with a measured value, which is measured by a DFLL of the digital baseband processor, of the Doppler frequency of the satellite signal, determines that the satellite signal is unavailable to be continuously tracked and accordingly informs the digital baseband processor to re-capture the satellite signal if an absolute value of a difference between the reference value and the measured value is greater than a predetermined threshold $F_{THR}$.

Advantageously, to detect whether the measured value of the Doppler frequency of the satellite signal is right by comparing the measured value with the reference value calculated based on the current velocity of the GPS receiver, the satellite signal which is unavailable to be continuously tracked can be timely re-captured, which will improve the accuracy and stability of the system.

While the foregoing description and drawings represent embodiments of the present invention, it will be understood that various additions, modifications and substitutions may be made therein without departing from the spirit and scope of the principles of the present invention as defined in the accompanying claims. One skilled in the art will appreciate that the invention may be used with many modifications of form, structure, arrangement, proportions, materials, elements, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being indicated by the appended claims and their legal equivalents, and not limited to the foregoing description.

What is claimed is:

1. A navigation system for detecting error on Doppler frequencies of a plurality of satellite signals measured by said navigation system, comprising:
    an offset calculator for calculating offsets of said Doppler frequencies of said satellite signals during a predetermined time period and calculating an average value of said offsets;
    an error detecting unit coupled to said offset calculator, said error detecting unit comparing an offset of a Doppler frequency of each satellite signal from the plurality of satellite signals with said average value of said offsets and determining whether each satellite signal is unavailable according to a comparison result for each satellite signal; and
    a satellite selecting unit for selecting satellite signals according to the comparison result for each satellite signal.

2. The navigation system of claim 1, wherein said error detecting unit determines a satellite signal is unavailable if a corresponding offset of a Doppler frequency of said satellite signal is greater than a product of said average value and a predetermined weight value, and also greater than a predetermined threshold.

3. The navigation system of claim 1, wherein said error detecting unit informs said navigation system not to select a satellite signal for positioning purpose if said error detecting unit determines said satellite signal is unavailable.

4. The navigation system of claim 1, wherein said error detecting unit informs said navigation system to re-capture a satellite signal if said error detecting unit determines said satellite signal is unavailable.

5. The navigation system of claim 1, wherein said offset calculator calculates an offset $\Delta f_d$ of a Doppler frequency of a satellite signal during said predetermined time period according to equation (1), $$\Delta f_d = f_d(T_1) - f_d(T_2) \quad (1)$$

wherein $f_d(T_1)$ represents a value of said Doppler frequency of said satellite signal measured at a first time $T_1$, $f_d(T_2)$ represents a value of said Doppler frequency of said satellite signal measured at a second time $T_2$ which is previous to said first time $T_1$ for said predetermined time period.

6. The navigation system of claim 1, wherein
said offset calculator calculates said offsets of said Doppler frequencies of said satellite signals during said predetermined time period and calculates said average value of said offsets for N times and
said error detecting unit compares said offsets of said Doppler frequencies of said satellite signals with said average value of said offsets and determines whether said satellite signals area unavailable according to corresponding comparison results for N times, and
wherein said error detecting unit concludes that said satellite signal is unavailable if said error detecting unit determines a satellite signal is unavailable for M times according to corresponding comparison results, wherein N and M are positive integers and M is no greater than N.

7. The navigation system of claim 1, further comprising:
a Doppler frequency calculator for calculating a reference value of a Doppler frequency of a satellite signal according to a velocity of said navigation system,
wherein said error detecting unit compares said reference value with a measured value, which is measured by said navigation system, of said Doppler frequency of said satellite signal, and determines whether said satellite signal is available to be continuously tracked according to a corresponding comparison result.

8. The navigation system of claim 7, wherein said error detecting unit determines that said satellite signal is not available to be continuously tracked if an absolute value of a difference between said reference value and said measured value is greater than a predetermined value.

9. The navigation system of claim 7, wherein said error detecting unit informs said navigation system to re-capture said satellite signal if said error detecting unit determines that said satellite signal is not available to be continuously tracked.

10. A method for detecting Doppler frequencies of a plurality of satellite signals measured by a navigation system, comprising the steps of:
calculating offsets, by an offset calculator, of said Doppler frequencies of the satellite signals during a predetermined time period;
calculating an average value, by the offset calculator, of the calculated offsets;
comparing each offset, by an error detecting unit, of a Doppler frequency of each satellite signal from the plurality of satellite signals with the average value of the offsets;
determining, by an error detecting unit, whether the satellite signal is unavailable according to a comparison result for each satellite signal; and
selecting satellite signals, by a satellite selecting unit, according to the comparison result for each satellite signal.

11. The method of claim 10, further comprising the step of:
determining a satellite signal as unavailable if a corresponding offset of a Doppler frequency of said satellite signal is greater than a product of said average value and a predetermined weight value, and also greater than a predetermined threshold.

12. The method of claim 10, further comprising the step of:
informing said navigation system not to select a satellite signal for positioning purpose if said satellite signal is determined as unavailable.

13. The method of claim 10, further comprising the step of:
informing said navigation system to re-capture a satellite signal if said satellite signal is determined as unavailable.

14. The method of claim 10, wherein the step 1 comprises the step of:
calculating an offset $\Delta f_d$ of a Doppler frequency of a satellite signal during said predetermined time period according to equation (1), $$\Delta f_d = f_d(T_1) - f_d(T_2) \quad (1)$$

wherein $f_d(T_1)$ represents a value of said Doppler frequency of said satellite signal measured at a first time $T_1$, $f_d(T_2)$ represents a value of said Doppler frequency of said satellite signal measured at a second time $T_2$ which is previous to said first time $T_1$ for said predetermined time period.

15. The method of claim 10, wherein step 1 to step 4 are repeated N times, further comprises the step of concluding that a satellite signal is unavailable if said satellite signal is determined as unavailable for M times according to corresponding comparison results,
wherein N and M are positive integers and M is no greater than N.

16. The method of claim 10, further comprising the step of:
calculating a reference value of a Doppler frequency of a satellite signal according to a velocity of said navigation system,
comparing said reference value with a measured value, which is measured by said navigation system, of said Doppler frequency of said satellite signal; and
determining whether said satellite signal is available to be continuously tracked according to a corresponding comparison result.

17. The method of claim 16, further comprising the step of:
determining said satellite signal is not available to be continuously tracked if an absolute value of a difference between said reference value and said measured value is greater than a predetermined value.

18. The method of claim 16, further comprising the step of:
informing said navigation system to re-capture said satellite signal if said satellite signal is determined as not available to be continuously tracked.

19. A global positioning system (GPS) receiver, comprising:
a digital baseband processor for capturing a plurality of satellite signals from a plurality of satellites, tracking said satellite signals, and generating navigation information of said satellite signals;
an offset calculator coupled to said digital baseband processor, said offset calculator calculating offsets of Doppler frequencies of said satellite signals during a predetermined time period according to said navigation information of said satellite signals and calculating an average value of said calculated offsets; and
an error detecting unit coupled to said offset calculator, said error detecting unit comprising an offset of a Doppler frequency of each satellite signal from the plurality of satellite signals with said average value and determining whether each satellite signal is unavailable according to a comparison result for each satellite signal; and
a satellite selecting unit for selecting satellite signals according to the comparison result for each satellite signal.

20. The GPS receiver of claim 19, wherein said error detecting unit determines a satellite signal is unavailable if a corresponding offset of a Doppler frequency of said satellite signal is greater than a product of said average value and a predetermined weight value, and also greater than a predetermined threshold.

21. The GPS receiver of claim 19, wherein said error detecting unit informs said baseband processor to re-capture a satellite signal if said error detecting unit determines said satellite signal is unavailable.

22. The GPS receiver of claim 19, wherein
the satellite selecting unit further selecting a set of satellite signals from said plurality of satellite signals according to said navigation information of said plurality of satellite signals and outputting said navigation information of said selected satellite signals for positioning purpose.

23. The GPS receiver of claim 19, further comprising:
a Doppler frequency calculator for calculating a reference value of a Doppler frequency of a satellite signal according to a velocity of said GPS receiver.

24. The GPS receiver of claim 19, wherein said error detecting unit determines that said satellite signal is not available to be continuously tracked and informs said digital baseband processor to re-capture said satellite signal if an absolute value of a difference between said reference value and said measured value is greater than a predetermined value.

25. The GPS receiver of claim 19, wherein a satellite signal is determined as available if a carrier to noise ratio (CNR) of said satellite signal calculated by said digital baseband processor is greater than a predetermined threshold.

* * * * *